June 22, 1965 T. D. READER 3,191,013

PHASE MODULATION READ OUT CIRCUIT

Filed July 23, 1962 2 Sheets-Sheet 1

INVENTOR
TREVOR DRAKE READER

BY Edward M. Farrell
ATTORNEY 3,191,013
Patented June 22, 1965

3,191,013

PHASE MODULATION READ OUT CIRCUIT

Trevor Drake Reader, Wayne, Pa., assignor to Sperry Rand Corporation, New York, N.Y., a corporation of Delaware Filed July 23, 1962, Ser. No. 211,699
4 Claims. (Cl. 235—164)

Figure 1A:
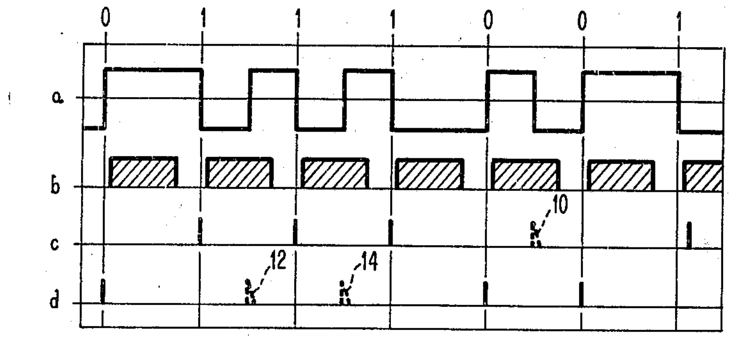
FIG. 1a PRIOR ART

This invention relates to a phase modulation system, and more particularly to a phase modulation system for reading binary information from a recording medium.

In many computer systems, binary information signals are recorded on a recording medium, such as a magnetic drum or tape. Such binary signals, having one of two different characteristics, may represent a "1" or a "0" bit of information. A signal representing a "1," for example, may be represented by an alternating signal having a first form for the first half of its digit period and a second form for the second half of its digit period. Likewise, a "0" may be represented by a signal which is in the second form for its first half of its digit period and the first form for the second half of its digit period. Both types of signal may be considered as passing through zero in going from one level to another at the middle of their digit periods.

It is this so called zero crossing point which is utilized in many phase modulation systems to produce pulse signals representing a "1" or a "0." By detecting the direction in which the binary signal is going at the zero crossing point, the nature of the signal, i.e. whether it is a "1" or a "0," may be determined.

One of the chief advantages which may be derived from a phase modulation system which uses zero cross over points to determine the nature of the information signal is that recorded sprocket or clock signals are not necessary to recover the information signals. So called "self sprocketing" systems are therefore feasible in phase modulation systems. These are systems in which the information signals are used to generate the sprocket signals, which may also be referred to as timing signals.

In a phase modulation system of the type mentioned, the original signals recorded on the recording medium generally pass through various stages during a reading operation to convert the recorded information into pulses which represent either a "1" or a "0." In passing through these various stages, so called "non-significant" pulse signals are produced. Non-significant pulse signals may be produced whenever the pattern of signals include two consecutive similar type information signals, for example, two consecutive "0"s or two consecutive "1"s. Under these conditions, the information signals pass through zero at points of time other than the middle of the digit periods, in addition to passing through at the middle of the digit periods. These points of time are generally the beginning of the digit periods.

Since only the zero cross over points at the middle of the digit periods are used to recover true information signals, other generated signals or pulses which have the same characteristic as information signals are considered non-significant or spurious signals and must be eliminated before the information may be applied to subsequent circuits.

In the past, circuit means have been employed to produce signals of a duration of three quarters of a digit period. These three quarter digit period signals were generally started by a true information pulse and used to inhibit the passage of spurious pulses to an output circuit.

In order to assure that the circuit means be triggered by a true information pulse, rather than a spurious pulse, it is necessary to provide a start-up pattern of signals which does not include any spurious signals. Such a pattern may be 1010 or some other pattern not including spurious or non-significant signals.

A fixed three quarter delay flop circuit is normally used to produce an inhibit signal which inhibits the passage of non-significant or spurious signals while still permitting the passage of true information signals. As long as there are no variations in the digit period times, there is nothing wrong with the system involving a fixed three quarter delay flop signal.

However, if two consecutive bits of information (not spurious bits) occur within the same three quarter digit period, the fixed three quarter delay flop will inhibit the passage of true information thereby introducing an error into the system. Such an occurrence of two bits of information within the same three quarter digit period could result from jitter in the system, variations in the speed of the recording medium or from other causes.

It is an object of this invention to provide an improved circuit for eliminating non-significant pulse signals in a phase modulation recording system.

It is a further object of this invention to provide an improved circuit for minimizing errors resulting from jitter or speed variations of a recording medium in a phase modulation read out system.

In accordance with the present invention, a phase modulation read out system includes pulse signals representing "1" and "0" bits of information, as well as non-significant pulse signals. A delay flop circuit of a three quarter digit period is used to eliminate the non-significant pulse signals. Means are provided for applying the pulses representing information to set said delay flop circuit. The non-significant pulse signals are used to reset the delay flop circuit. In the absence of a non-significant pulse signal, the delay flop circuit is automatically reset at the end of three quarters of a digit period.

Figure 1B:
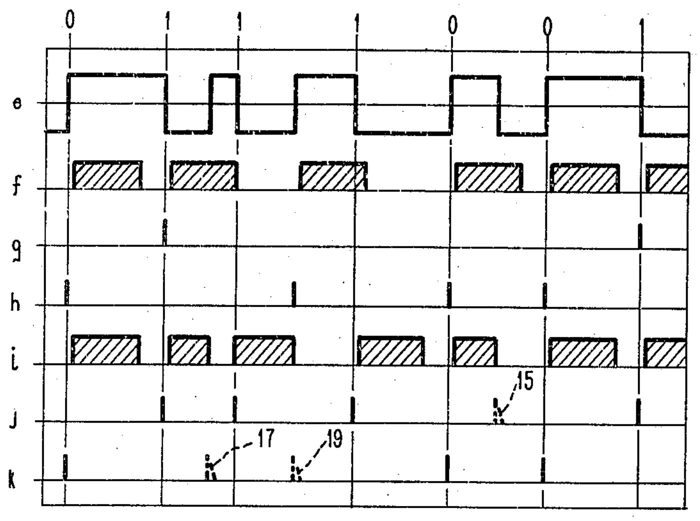
Figure 2:
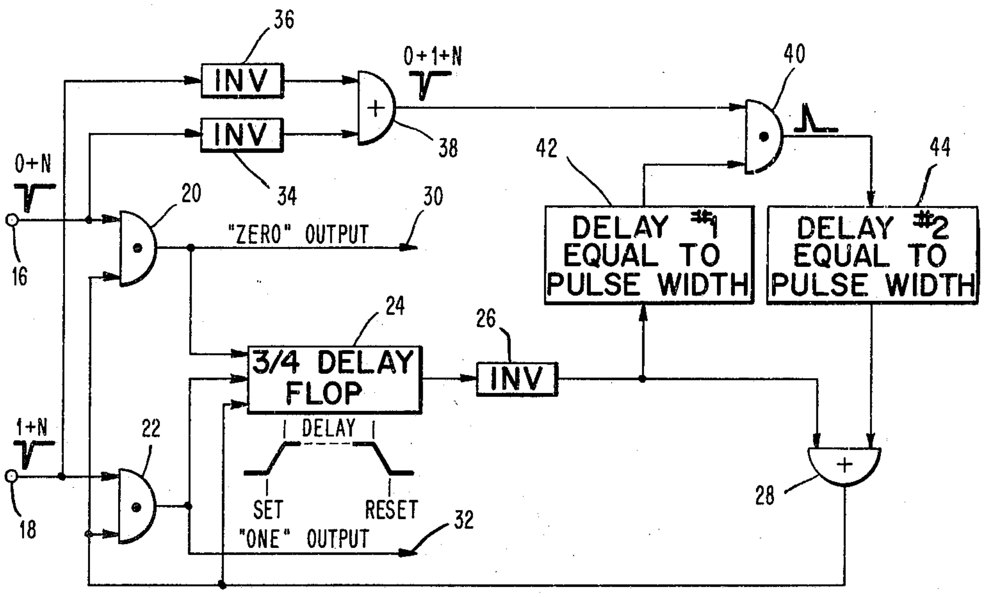

Other objects and advantages of the present invention will be apparent and suggest themselves to those skilled in the art, from a reading of the following specification and claims, in conjunction with the accompanying drawings, in which FIGURES 1*a* and 1*b* are a series of waveforms shown for the purpose of describing the present invention, and FIGURE 2 is a block diagram illustrating one form of the present invention, Referring particularly to FIGURE 1*a*, waveform *a* illustrates a typical square wave signal representing information signals read out from a recording medium, such as a magnetic tape, for example. These square wave signals are generally generated by sine wave signals which are applied to a bi-stable circuit, such as Schmitt trigger circuit.

In a magnetic read out system involving square wave signals, pulses are generally generated each time the square wave signals change direction. These pulse signals represent bits of information and also include spurious or non-significant pulses. As previously mentioned, a fixed three quarter delay flop circuit is generally used to inhibit the spurious pulse signals while still permitting the information pulses to be passed to subsequent utilization circuits.

Waveform *b* illustrates a three quarter delay flop signal. Waveform *c* illustrates a series of pulse signals representing "1" bits of information. It is noted that a spurious pulse 10 illustrated in dotted lines is the type of pulse which is inhibited or eliminated by the signal the three quarter delay flop circuit, such as the signal illustrated by waveform *b*.

Waveform *d* illustrates a series of "0" bits of information. Spurious pulse signals 12 and 14, illustrated in dotted lines, are the type of pulse signals which are inhibited by the three quarter digit signal illustrated by waveform *b*.

Let us now consider a situation in which the speed of the recording medium causes the read out signal to be closer together than a normal digit period. The square wave signal representing the read out information is now illustrated by waveform *e* of FIGURE 1*b*. Assume that the same three quarter delay flop signal is used to inhibit the non-significant pulses. This three quarter digit signal is represented by waveform *f*.

Referring to waveform *g*, "1" bits of information are represented. However, in comparing waveform *g* with waveform *c*, it is noted that several "1" bits of information are missing. The reason for this is that the three quarter digit signal of waveform *f* would tend to inhibit the passage of such signals. It is seen that when two consecutive bits of information occur within three quarters of a digit period that error will result in the system. An examination of waveform *h* which normally should have the same signal train of waveform *d*, also includes errors as a result of utilizing a fixed three quarter delay flop inhibit signal.

The present invention utilizes the significant pulse signals to set the three quarter delay flop circuit and utilizes the non-significant pulses to reset the three quarter delay flop circuit. Consequently, the delay flop circuit will not inhibit any information pulse signals even though two bits of such information pulse signals occur within the same three quarter digit period. This condition is illustrated by a reference to waveforms *i*, *j*, and *k* of FIGURE 1. Waveform *g* is missing "1" information pulses and waveform *h* includes a non-significant pulse.

It is noted that the non-significant pulse signals 15, 17 and 19 are eliminated by the inhibit signal of waveform *i* in the same manner that the non-significant pulse signals 10, 12 and 14 were eliminated by the inhibit signal of waveform *b*. The wave form *i* is variable in width and are reset by the non-significant pulses except when automatic resetting is involved.

Referring particularly to FIGURE 2, pulse signals representing "0" bits of information and non-significant pulses are applied to an input terminal 16. Pulse signals representing "1" bits of information and non-significant pulses are applied to an input terminal 18. Signals from the input terminals 16 and 18 are applied to a pair of AND gates 20 and 22, respectively. The output signal from the AND gates 20 and 22 are applied to a three quarter delay flop circuit 24. Normally, the three quarter delay flop circuit is set and is automatically reset at the end of a three quarter digit period, except in cases where it is reset by non-significant pulses as will be described.

The output signal from the three quarter delay flop 24 is fed back through an inverter circuit 26 and an OR data circuit 28 to the input circuits of AND gates 20 and 22. The fed back signal acts as an inhibit signal to prevent any signal from passing through AND gates 20 and 22. Consequently, under normal conditions in which no speed variations of a recording medium is involved, information signals will trigger the three quarter delay flop circuit with the non-significant pulses being inhibited.

Pulse signals representing "0" bits of information are also applied from the AND gate 20 to an output terminal 30. Likewise, pulse signals representing "1" bits of information are applied to an output terminal 32.

Pulse signals from the input terminals 16 and 18 are also applied through a pair of inverter circuits 34 and 36 to an OR gate circuit 38. The output signals from the OR gate circuit 38 therefore include "0" bits of information or "1" bits of information and both types of non-significant pulse signals.

Signals from the OR gate circuit 38 are applied to an AND gate circuit 40. Signals from the inverter circuit 26 involving the inverted signal from the three quarter delay flop circuit 34 is delayed slightly, generally by one pulse width duration, by a delay circuit 42 and then applied to the AND gate circuit 40. With the delay involved in the delay circuit 42, no information pulses are passed through AND gate circuit 40. However, non-significant pulse signals are passed through the AND gate circuit 40 to a delay circuit 44. The output signal from the delay circuit 44 passes through the OR gate circuit 28 to reset delay flop 24.

When no non-significant pulses are present, indicating that two consecutive bits of information are of different characters, the delay flop circuit 24 will normally be automatically reset at the end of a three quarter digit period. Such delay flop circuits are well known to those skilled in the art. However, when a non-significant pulse is present, indicating that two consecutive bits of information are of the same character, the delay flop circuit 24 will be reset immediately by the non-significant pulse and prior to the end of the normal three quarter digit period.

It is seen that if the present invention is employed that errors resulting from two consecutive bits of information occurring within three quarters of a digit period will be eliminated. While the present invention does not eliminate all possible types of errors resulting from speed variations in a recording medium, it does eliminate one of the major causes of errors.

It is realized that the system of FIGURE 2 is shown merely by way of example. In some cases, less than a three quarter delay signal may be involved in eliminating non-significant pulse signals.

The embodiments of the invention in which an exclusive property or privilege is claimed are defined as follows:

1. Means for eliminating non-significant pulse signals from a series of information pulse signals comprising a control circuit to produce an output signal of a first or second level, means for applying said information pulse signals to switch said control circuit to change the output signal therefrom from said first to said second level, an AND gate circuit, means for applying said non-significant and information pulse signals to said AND gate circuit, means for applying an output signal from said control circuit to inhibit the passage of signals through said AND gate circuit when said control circuit produces an output signal of said second level and to permit the passage of signals when said control circuit produces an output signal of said first level, means for applying said non-significant pulse signals to reswitch said control circuit to change the output signal therefrom from said second level to said first level, and the output signal level from said control circuit being automatically reswitched from said second level to said first level after a pre-determined time period in the absence of said non-significant pulses.

2. In a phase modulation read out system wherein recorded information signals are normally separated in time by one digit period and are translated into a series of pulse signals representing "1" and "0" bits of information and include non-significant pulse signals between two bits of information whenever said two bits of information are of the same characteristic, a delay flop circuit connected to be set by an information input pulse and to be automatically reset at the end of a time period greater than one half and less than a full digit period, means for applying said non-significant pulse signals to reset said delay flop circuit, said delay flop circuit being automatically reset in the absence of said non-significant pulse signals, an AND gate circuit, means for applying said pulses representing information and non-significant pulse signals to said AND gate circuit, means for applying said pulses representing information from said AND gate circuit to set said delay flop circuit, and means for applying an output signal from said delay flop circuit to inhibit the passage of said non-significant pulse signals through said AND gate circuit.

3. The invention as set forth in claim 2 wherein a pair of AND gate circuits are provided, one for receiving "1" bits of information and the other for receiving "0" bits of information.

4. The invention as set forth in claim 3 wherein output terminals are provided for each of said AND gate circuits to permit said information to be applied to subsequent utilization circuits.

No reference cited.

MALCOLM A. MORRISON, *Primary Examiner.*